United States Patent [19]

Hirayama et al.

[11] 3,865,825

[45] Feb. 11, 1975

[54] PYRIMIDINYLPHRAZOLONE DERIVATIVE AND PROCESS OF PREPARING THE SAME

[75] Inventors: Tadamasa Hirayama; Kiyoshi Nakagawa, both of Tokyo, Japan

[73] Assignee: Daiichi Seiyaku Co., Ltd., Tokyo, Japan

[22] Filed: July 31, 1972

[21] Appl. No.: 276,469

[30] Foreign Application Priority Data
July 31, 1971 Japan.............................. 46-57675
Aug. 5, 1971 Japan.............................. 46-59216

[52] U.S. Cl......................................... 260/256.4 C
[51] Int. Cl............................................ C07d 51/38
[58] Field of Search ............................ 260/256.4 C

[56] References Cited
UNITED STATES PATENTS
2,731,473   1/1956   Taub.................................. 260/310

OTHER PUBLICATIONS

Naito et al. –C.A. 70, 57876q (1969).
Brown – "The Pyrimidines –Supplement I" (1970) Wiley – Interscience – pages 31,32,33.

*Primary Examiner*—Raymond V. Rush
*Attorney, Agent, or Firm*—Oblon, Fisher, Spivak, McClelland & Maier

[57]            ABSTRACT

A intermediate, 1-(4-methyl-6-hydroxy-2-pyrimidinyl)-3-methylpyrazoline-5-one, is produced by reacting aminoguanidine or one of its salts with acetoacetamide, and then reacting the product with an alkyl acetoacetate in the presence of a basic catalyst. The intermediate is useful for producing 1-(4-methyl-6-methoxy-2-pyrimidinyl)-3-methyl-5-methoxypyrazole which has been employed clinically as an excellent anti-inflammatory drug.

1 Claim, No Drawings

PYRIMIDINYLPHRAZOLONE DERIVATIVE AND PROCESS OF PREPARING THE SAME

BACKGROUND OF THE INVENTION

Field of the Invention

This invention relates to the preparation of an intermediate compound useful in the preparation of mepirizole, which is clinically employed as an anti-inflammatory drug. More particularly, it relates to a process for the synthesis of the intermediate, 1-(4-methyl-6-hydroxy-2-pyrimidinyl)-3-methylpyrazoline-5-one.

Description of the Prior Art

Other processes for synthesizing mepirizole are well known to those having ordinary skill in the art. One such process (U.S. Pat. No. 3,426,023) involves a long, multi-step synthesis in which relatively expensive reagents are employed. In addition, some of the synthetic steps in the process require severe reaction conditions resulting in the formation of undesired by-products of at least one of the intermediate compounds. These disadvantages are overcome by the process of the present invention in that an intermediate is produced in a reaction of only several steps from less expensive starting materials, which are easily and directly converted to mepirizole in a one-step process.

SUMMARY OF THE INVENTION

Accordingly, it is one object of this invention to provide a simple, two-step process for the synthesis of 1-(4-methyl-6-methoxy-2-pyrimidinyl)-3-methyl-5-methoxypyrazole.

It is another object of this invention to provide an intermediate which can be converted to mepirizole in a simple, one-step process.

These and other objects of this invention are achieved by providing a method for the synthesis of 1-(4-methyl-6-hydroxy-2-pyrimidinyl)-3-methylpyrazoline-5-one by the reaction between aminoguanidine or one of its salts with acetoacetamide, and then reacting the 3-methylpyrazoline-5-one derivative produced with an alkyl acetoacetate. The intermediate produced can be easily converted in a one-step process to mepirizole, which is a clinically useful anti-inflammatory drug.

DESCRIPTION OF THE PREFERRED EMBODIMENTS

The intermediate 1-(4-methyl-6-hydroxy-2-pyrimidinyl)-3-methylpyrazoline-5-one, (I) which can be readily converted to 1-(4-methyl-6-methoxy-2-pyrimidinyl)-3-methyl-5-methoxypyrazole (hereinafter referred to as mepirizole), may be chemically represented by the following tautomeric structural formulas (I) and (I'):

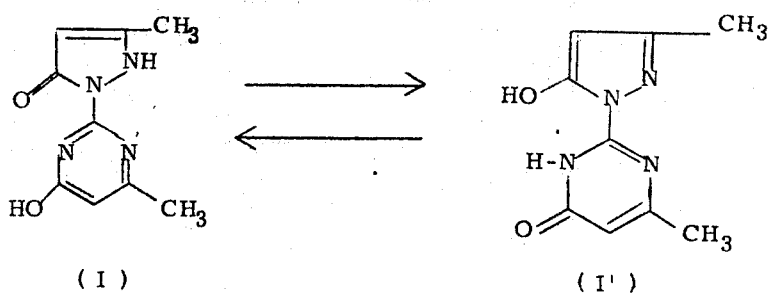

The intermediate is readily converted in mepirizole in a one-step process by treatment with an alkylating agent such as dimethylsulfate. This conversion obviates the older, two-step process for the alkylation of a different intermediate in the conventional process for the synthesis of mepirizole. Furthermore, the process of this invention for producing mepirizole does not include as an intermediate the pyrimidinylhydrazine derivative (X) which is an intermediate in the conventional process. As a result, the overall process for producing mepirizole is shortened to three steps.

The reactions for the production of the novel intermediate are conducted as follows: aminoguanidine or one of its acid salts (XII) is reacted with acetoacetamide (XIII) in a solvent at temperatures from 20° to 120°C., preferably from 40° to 50°C., to form the 1-formamidinopyrazolone derivative (XIV), which is further reacted with an alkyl acetoacetate to product the desired intermediate.

As previously mentioned, structures (I) and (I') represent the tautomeric forms of the intermediate of this invention. For convenience, the intermediate will be represented only by formula (I) when referred to at places within the specification. The chemical relationship of the intermediate to mepirizole is clear from a comparison of the structure of the intermediate with the structural formula of mepirizole as follows:

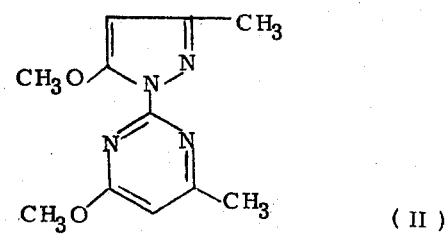

Previously, the synthesis of mepirizole has involved a long and complicated process starting with urea or thiourea as shown below:

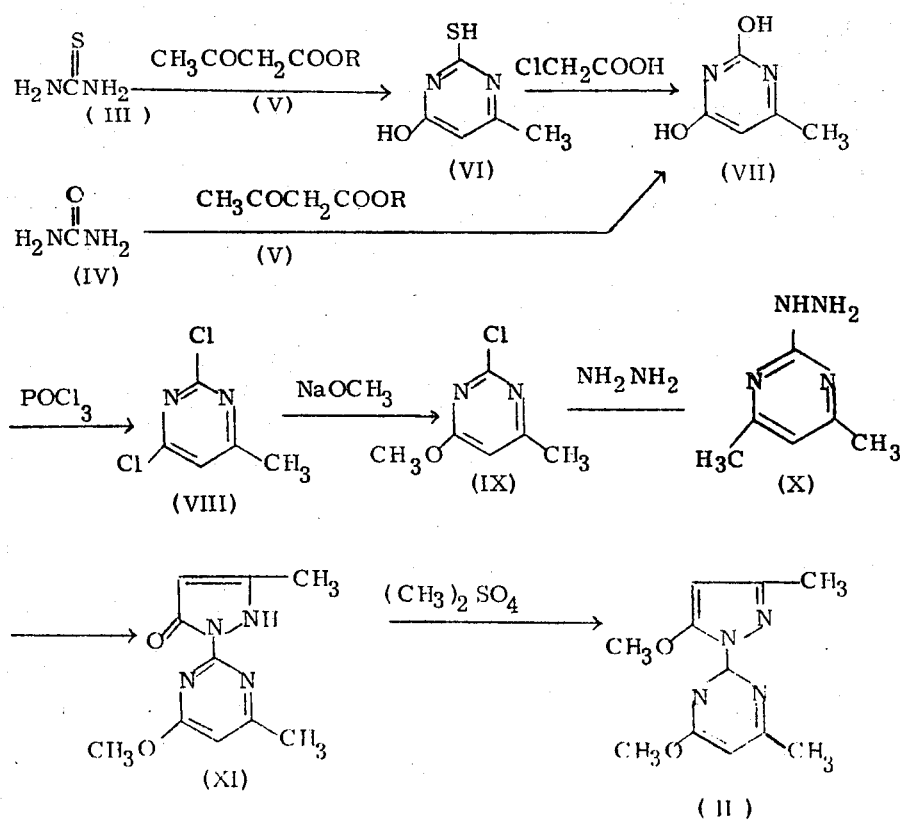

Industrial production of mepirizole by this process has been hampered because of the long and complicated process involved, and because of the employment of expensive reagents. For example, an alkoxylation step (VIII to IX) and an alkylation step (XI to II) are required in the synthesis. Another disadvantage of the process involves the selective monoalkoxylation at position 6 of the pyrimidine ring of compound (VIII) to produce compound (IX). This conversion must be conducted under very severe conditions and it is impossible to avoid the formation of a small amount of by-product, which is the dialkoxylated compound of compound (VIII). Thus, the process has several disadvantages.

Therefore, a considerably simpler and more direct industrial process for the synthesis of mepirizole is greatly desired. According to the present invention, the intermediate can be easily prepared by the following reactions:

The amino-guanidine (XII) is shown as the salt of an acid wherein HA represents an inorganic acid such as HCl, $HNO_3$, $H_2SO_4$, $H_2CO_3$. The alkyl group R of the acetoacetate (XV) is a member selected from the group consisting of lower alkyl groups.

Previously, the process for the synthesis of compound (XIV) used an alkyl acetoacetate instead of acetoacetamide in the reaction with aminoguanidine (C.A., 48, 165 (1954)). This method, however, is insufficient for the production of compound (XIV) because of the long reaction times (48 hours) involved and because of the relatively low yields (70.5%) obtained.

On the other hand, by using acetoacetamide as the coreactant instead of an alkyl acetoacetate with aminoguanidine under the preferred reaction conditions of the method in this invention, the reaction is substantially complete within one to 5 hours, and gives compound (XIV) in high yield (over 95%). Another

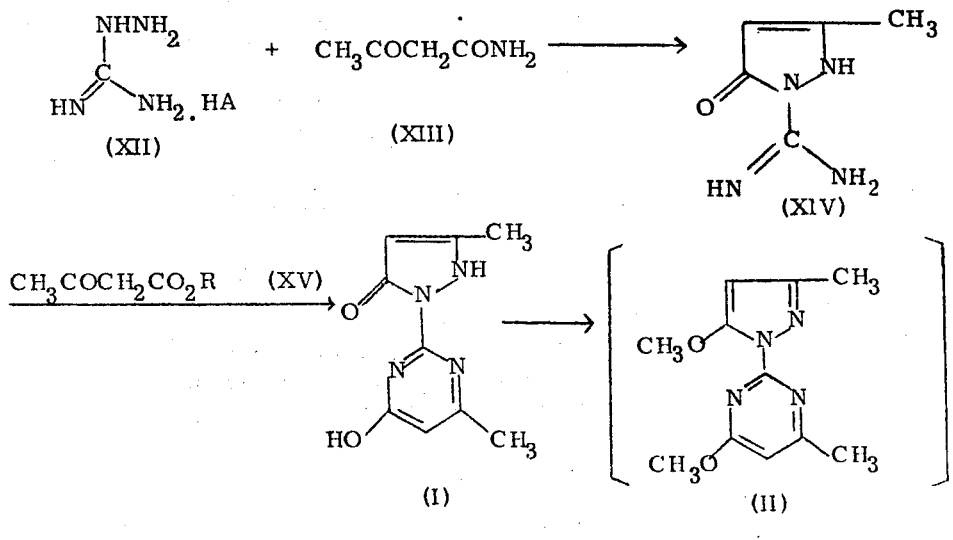

merit of this reaction is the fact that compound (XIV) can be separated as the free base which is a suitable form for its reaction with an alkyl acetoacetate.

In the process of this invention, the condensation of aminoguanidine (XII) and acetoacetamide in an aqueous solution results in the release of ammonia which consequently neutralizes the inorganic acid salts of aminoguanidine to yield the insoluble free base of compound (XIV). Suitable solvents for this step of the reaction include water and aqueous alcohols. Preferably, water is used. Since the conversion of the pyrazolone (XIV) to the intermediate (I) must be conducted under anhydrous conditions in a basic solution, isolation of compound (XIV) as the free base is required before its reaction with the alkyl acetoacetate (XV). In the former reaction for synthesizing pyrazolone (XIV), the reaction between an alkyl acetoacetate and aminoguanidine (XII) resulted in the release of free acid HA which reacted with the pyrazolone (XIV) to form a salt soluble in the aqueous reaction solution.

The reaction between compound (XIV) and compound (XV) is conducted by heating the reactants together in an inert solvent at a temperature of between 20° and 100°C., preferably between 50° and 80°C., in the presence of a basic catalyst. Suitable solvents which do not react with compounds (XIV) or (XV) include the lower alcohols such as methanol, ethanol and isopropyl alcohol. Suitable basic catalysts include the alkali metal and alkaline earth metal alcoholates, hydroxides, carbonates and bicarbonates; organic bases such as methylamine, dimethylamine, trimethylamine and piperidine; and ammonia. The amount of basic catalyst employed in the reaction ranges from 0.5 to 3.0 moles times, preferably from 1.0 to 1.5 moles times, the number of moles of compound (XIV) employed.

Having now generally described the invention, a further understanding can be attained by reference to the following specific Examples, which are provided herein for purposes of illustration only and are not intended to be limiting in any manner unless otherwise specified herein.

EXAMPLE 1

About a 13.6 g. quantity of aminoguanidine.bicarbonate was added to an aqueous solution of acetoacetamide, which was prepared from 18 g. of 10 per cent ammonia water and 8.40 g. of ketene dimer, and the solution was heated at 60° to 70°C. for 4 hours. After cooling, a precipitate of 1-formamidino-3-methyl-5-pyrazolone resulted which was collected by filtration, washed with water and then dried to give a yield of 13.6 g. A 1.74 g. quantity of methyl acetoacetate and 2.1g g the pyrazolone compound were added to a sodium methylate solution prepared from 0.35 g. of sodium metal in 10 ml. of methanol. The solution was refluxed on a water bath for 4 hours. After the reaction, methanl was removed in vacuo from the reaction solution. The residue was dissolved in 35 ml. of water and the pH of the solution was adjusted to 3 with 10% hydrochloric acid. A precipitate resulted which was collected by filtration, washed and dried to give 2.79 g. of 1-(4-hydroxy-6-methyl-2-pyrimidinyl)-3-methyl-pyrazoline-5-one having a melting point of 202°C. (decom.). Yield: 90.3%. When the crystals were recrystallized from an aqueous methanol solution, the melting point of the crystals was 204° to 205°C.

Elemental Analysis for $C_9H_{10}N_4O_2$: Calc. %: C, 52.42; H, 4.89; N, 27.17. Found %: C, 52.47; H, 5.01; N, 26.94.

EXAMPLE 2

A mixture of a 50 percent aqueous solution of cyanamide (8.40 g.) and a 40 percent aqueous solution of hydrazine.sulfate (20.3 g.) was adjusted to pH 7 to 8 at 45°C. and then the solution was heated at 70°C. for 1 hour. After cooling, a solution of acetoacetamide, which was prepared from 8.40 g. of ketene dimer and 18 g. of 10 percent ammonia water, was added to the solution. The solution was heated at 50°C. for 4 hours. After cooling, a precipitate of 1-formamidino-3-methyl-5-pyrazolone resulted which was collected by filtration, washed and dried to give 13.5 g. The pyrazolone had a melting point of 231 to 233°C. (decomp.). Yield: 93.3%. A 2.1 g. quantity of 1-formamidino-3-methyl-5-pyrazolone, 2.07 g. of potassium carbonate and 2.15 g. of ethyl acetoacetate were added to 25 ml. of methanol. The solution was kept for 30 minutes at room temperature and then refluxed on a water bath for 3 hours. Then, the solution was treated in substantially the same way as in Example 1 to give 2.63 g. of 1-(4-hydroxy-6-methyl-2-pyrimidinyl)-3-methyl-pyrazoline-5-one having a melting point of 204° to 205°C. (decomp.). Yield: 90.3%.

EXAMPLE 3

A mixture of 2.15 g. of 1-(4-hydroxy-6-methyl-2-pyrimidinyl)-3-methyl-pyrazoline-5-one, 5.40 g. of sodium methylate and 50 ml. of dimethylacetamide were stirred at 30°C. for 30 minutes. About 12.6 g. of dimethyl sulfate was added to the solution and then the solution was stirred for 2 hours. Solvent was removed below 60°C. resulting in the isolation of a 65% yield of crude mepirizole, 1-(4-methoxy-6-methyl-2-pyrimidinyl)-3-methyl-5-methoxypyrazole. The crude material was dissolved in 20 ml. of water and extracted with benzene. Benzene was removed from the extract and the residue obtained thereby was absorbed on an alumina column. The fraction was eluted with cyclohexane. The product obtained was recrystallized from water to give 2.6 g. of 1-(4-methoxy-6-methyl-2-pyrimidinyl)-3-methyl-5-methoxypyrazole having a melting point of 88°–89°C., in a yield of 44.4%.

Having now fully described the invention, it will be apparent to one of ordinary skill in the art that many changes and modifications can be made thereto without departing from the spirit or scope of the invention as set forth herein. Accordingly,

What is claimed and intended to be covered by Letters Patent is:

1. 1-(4-methyl-6-hydroxy-2-pyrimidinyl)-3-methyl-pyrazoline-5-one.

* * * * *